UNITED STATES PATENT OFFICE.

ISAAC R. EDMANDS, OF NIAGARA FALLS, NEW YORK, ASSIGNOR TO ELECTRO METALLURGICAL COMPANY, OF CHICAGO, ILLINOIS, A CORPORATION OF WEST VIRGINIA.

PROCESS OF PRODUCING LOW-CARBON FERRO-ALLOYS.

1,063,341. Specification of Letters Patent. Patented June 3, 1913.

No Drawing. Application filed September 24, 1907. Serial No. 394,272.

*To all whom it may concern:*

Be it known that I, ISAAC R. EDMANDS, a citizen of the United States, residing at Niagara Falls, in the county of Niagara and State of New York, have invented certain new and useful Improvements in Processes of Producing Low-Carbon Ferro-Alloys, of which the following is a specification.

The value of the ferro-alloys commonly employed as a means of introducing chromium, vanadium and other metals into special steels, is largely dependent on a low carbon content, and methods of reduction involving the use of expensive metallic reducing agents, or giving low yields, are employed to produce these alloys.

The present process of producing low-carbon ferro-alloys comprises two stages. In the first stage, a high-carbon ferro-alloy, for example one of chromium, molybdenum, tungsten, titanium, vanadium or nickel, is cheaply produced by smelting a mixture of an ore of the alloying metal, an excess of carbon and a source of iron. The reduction may be effected in an ordinary electric furnace having a carbon lining and depending carbon electrodes. In the second stage, the carbon is removed or reduced to a small percentage by heating the molten alloy to a temperature such that the affinity of oxygen for the contained carbon is greater than its affinity for the chromium or other alloyed metal, and then subjecting it for a limited period to the action of air or other oxidizing gas. In the ordinary Bessemer process of producing steel, the molten pig-iron containing a small amount of silicon or other highly-positive metal and carbon is subjected to the action of air at temperatures such that the affinity of oxygen for the silicon or other alloyed positive metal is greater than its affinity for carbon, so that the removal of the alloyed metal substantially precedes the removal of carbon. But when the temperature of one of the specified alloys of iron, a highly-positive metal and carbon, is raised to a temperature above that employed in the Bessemer steel industry or usually produced by combustion but readily-obtainable in an electric furnace, for example a temperature between 1600° C. and 2500° C. the relative affinities of the alloyed metal and carbon toward oxygen change, the heat of combination of the carbon and oxygen becomes greater than the heat of combination of the alloyed metal and oxygen, and the carbon may then be largely or substantially eliminated by oxidation before any considerable percentage of the alloyed metal is removed.

In carrying out the second stage of the process, the ferro-alloy high in carbon may be subjected to the action of the oxidizing gas in the electric furnace in which it has been produced, as by providing the lower end of the furnace with openings and forcing air through these openings and through the molten alloy. Or the alloy may be tapped from the electric reduction furnace, at a high temperature, into a separate vessel, and therein treated with the oxidizing gas, more heat being supplied if necessary, either by an arc, or by passing an electric current through the alloy, acting as a resistor, or through a slag or other resistor in contact with or proximity to the alloy. Or the cast alloy may be remelted and electrically heated to the requisite temperature. The air or other oxidizing gas may either be forced through the alloy or caused to act upon its surface, as in the present art of bessemerizing pig-iron.

The term "ferro-alloys," as used in the claims, means a product in which the metal alloyed with iron is the important and valuable constitutent, as distinguished from pig-iron, which may contain one or two per cent. of silicon and manganese.

I claim:

1. The process of producing low-carbon ferro-alloys, which consists in first producing a ferro-alloy high in carbon, and then subjecting the product, heated to a temperature such that the affinity of oxygen for the contained carbon is greater than its affinity for the alloyed metal, to the action of an oxidizing gas.

2. The process of producing low-carbon ferro-alloys, which consists in first producing a ferro-alloy high in carbon, and then subjecting the product, electrically heated to a temperature such that the affinity of oxygen for the contained carbon is greater than its affinity for the alloyed metal, to the action of an oxidizing gas.

3. The process of producing low-carbon ferro-alloys, which consists in electrically smelting a compound of the alloying metal, an excess of carbon and a source of iron, and subjecting the high-carbon product, electrically heated to a temperature such that the affinity of oxygen for the contained carbon is greater than its affinity for the alloyed metal, to the action of an oxidizing gas.

4. The process of producing low-carbon ferrochromium, which consists in first producing ferrochromium high in carbon, and then subjecting the product, heated to a temperature such that the affinity of oxygen for the contained carbon is greater than its affinity for the chromium, to the action of an oxidizing gas.

5. The process of producing low-carbon ferrochromium, which consists in first producing ferrochromium high in carbon, and then subjecting the product, electrically heated to a temperature such that the affinity of oxygen for the contained carbon is greater than its affinity for chromium, to the action of an oxidizing gas.

6. The process of producing low-carbon ferrochromium, which consists in electrically smelting a compound of chromium, an excess of carbon and a source of iron, and subjecting the high-carbon product, electrically heated to a temperature such that the affinity of oxygen for the contained carbon is greater than its affinity for chromium, to the action of an oxidizing gas.

7. The process of producing low-carbon ferro-alloys, which consists in first producing a ferro-alloy high in carbon, and then subjecting the product, heated to a temperature above 1600° C., to the action of an oxidizing gas.

In testimony whereof, I affix my signature in presence of two witnesses.

ISAAC R. EDMANDS.

Witnesses:
E. F. PRICE,
G. E. COX.